(12) United States Patent
Chowdhury et al.

(10) Patent No.: US 7,752,203 B2
(45) Date of Patent: Jul. 6, 2010

(54) SYSTEM AND METHOD FOR LOOK AHEAD CACHING OF PERSONALIZED WEB CONTENT FOR PORTALS

(75) Inventors: Srinivas Chowdhury, Temple, TX (US); Pradeep Nambiar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 10/926,593

(22) Filed: Aug. 26, 2004

(65) Prior Publication Data

US 2006/0047661 A1    Mar. 2, 2006

(51) Int. Cl.
G06F 17/30   (2006.01)
(52) U.S. Cl. .................. 707/736; 707/751; 707/768; 707/769; 707/770; 707/784
(58) Field of Classification Search ............... 707/3, 707/6, 104.1, 999.003, 999.107
See application file for complete search history.

(56) References Cited

U.S. PATENT DOCUMENTS

| | | | |
|---|---|---|---|
| 5,715,445 A | 2/1998 | Wolfe | |
| 5,802,292 A | 9/1998 | Mogul | |
| 5,878,223 A | 3/1999 | Becker et al. | |
| 5,978,841 A * | 11/1999 | Berger | 709/217 |
| 6,067,565 A | 5/2000 | Horvitz | |
| 6,085,226 A | 7/2000 | Horvitz | |
| 6,088,718 A | 7/2000 | Altschuler et al. | |
| 6,128,701 A | 10/2000 | Malcolm et al. | |
| 6,185,608 B1 * | 2/2001 | Hon et al. | 709/216 |
| 6,222,520 B1 * | 4/2001 | Gerszberg et al. | 715/784 |
| 6,282,542 B1 | 8/2001 | Carneal et al. | |
| 6,377,974 B1 | 4/2002 | Feigenbaum | |
| 6,385,641 B1 | 5/2002 | Jiang et al. | |
| 6,393,526 B1 | 5/2002 | Crow et al. | |
| 6,442,651 B2 | 8/2002 | Crow et al. | |
| 6,463,509 B1 * | 10/2002 | Teoman et al. | 711/137 |
| 6,553,393 B1 | 4/2003 | Eilbott et al. | |
| 6,553,461 B1 | 4/2003 | Gupta et al. | |
| 6,564,259 B1 | 5/2003 | Baber et al. | |
| 6,564,260 B1 | 5/2003 | Baber et al. | |
| 6,584,498 B2 | 6/2003 | Nguyen | |
| 6,598,048 B2 | 7/2003 | Carneal et al. | |
| 6,604,103 B1 | 8/2003 | Wolfe | |
| 6,606,646 B2 | 8/2003 | Feigenbaum | |
| 6,622,168 B1 | 9/2003 | Datta | |
| 6,640,284 B1 * | 10/2003 | Shaw et al. | 711/129 |
| 6,697,806 B1 * | 2/2004 | Cook | 707/10 |

(Continued)

*Primary Examiner*—Don Wong
*Assistant Examiner*—Thanh-Ha Dang
(74) *Attorney, Agent, or Firm*—William H. Steinberg; Suiter Swantz pc llo

(57) ABSTRACT

The present invention is a method and system for look ahead caching of personalized web content based upon resource capability. Personalized web content may be delivered to a cache before the web pages are accessed by the user by optimally using the application systems CPU cycles or optionally off-loading the caching to an external system. The system and method of the present invention may employ a resource manager to monitor server usage and off-load the caching process to another dedicated system that may be currently under utilized, while making use of the time period between server response and the actual time the response is seen by the user (network time) and the user think time available for the server.

16 Claims, 5 Drawing Sheets

U.S. PATENT DOCUMENTS

| | | | |
|---|---|---|---|
| 7,016,844 B2* | 3/2006 | Othmer et al. | 704/270.1 |
| 7,062,511 B1* | 6/2006 | Poulsen | 707/104.1 |
| 7,155,003 B2* | 12/2006 | Fleming et al. | 379/221.13 |
| 7,225,462 B2* | 5/2007 | Bass et al. | 726/6 |
| 2002/0083148 A1* | 6/2002 | Shaw et al. | 709/214 |
| 2002/0138555 A1* | 9/2002 | Yu | 709/203 |
| 2002/0147770 A1* | 10/2002 | Tang | 709/203 |
| 2003/0004897 A1* | 1/2003 | Smith, IV | 705/76 |
| 2003/0023726 A1* | 1/2003 | Rice et al. | 709/225 |
| 2003/0074580 A1* | 4/2003 | Knouse et al. | 713/201 |
| 2003/0097443 A1* | 5/2003 | Gillett et al. | 709/225 |
| 2003/0097564 A1* | 5/2003 | Tewari et al. | 713/171 |
| 2003/0105862 A1* | 6/2003 | Villavicencio | 709/225 |
| 2003/0131191 A1* | 7/2003 | Zhang et al. | 711/113 |
| 2004/0220791 A1* | 11/2004 | Lamkin et al. | 703/11 |
| 2005/0004983 A1* | 1/2005 | Boyd | 709/204 |
| 2005/0149499 A1* | 7/2005 | Franz et al. | 707/3 |
| 2005/0286711 A1* | 12/2005 | Lee et al. | 379/399.01 |
| 2006/0143147 A1* | 6/2006 | Pearson et al. | 707/1 |

* cited by examiner

SYSTEM AND METHOD FOR LOOK AHEAD CACHING OF PERSONALIZED WEB CONTENT FOR PORTALS

FIELD OF THE INVENTION

The present invention generally relates to the field of look ahead caching of web content, and more particularly to a system and method for look ahead caching of personalized web content while optimally utilizing resource capability.

BACKGROUND OF THE INVENTION

Delivering personalized content is a popular feature of on-line services. Service providers, in order to attract and retain customers, implement procedures for retrieving a user's profile and providing relevant content to the user. A user's profile may contain a user's web content history along with personal preferences of the user. When a user requests web content through the service provider, the user may be required to sign-in, for example, by providing a user-name and password. A user's profile may be retrieved during the sign-in process and web content in conformity with the user's profile may be provided to the user. This is highly advantageous as it may improve the user's experience of the service.

Rules and procedures for developing personalized content have become sophisticated. A drawback associated with the increasing factors considered for personalization is the delay associated with querying content in conformity with the user's preferences. A typical user may desire content is retrieved and provided in a rapid fashion. Caching mechanisms have been employed by service providers to reduce the latency. For example, caching known to the art may reduce retrieval time for web content that has been previously accessed by the user.

However, caching known to the art does not provide improved performance for first time access to web content. Additionally, if there is a change in a user's profile, the web content may require re-caching. Consequently, a system and method of look ahead caching is necessary which may initiate a cache before the content has been requested.

SUMMARY OF THE INVENTION

Accordingly, the present invention is directed to a method and system for look ahead caching of personalized web content while optimally utilizing resource capability. Advantageously, personalized web content may be delivered to a cache before the web pages are accessed by the user by optimally using the application systems central processing unit (CPU) cycles. The system and method of the present invention for look ahead caching may make use of the time period between server response and the actual time the response is seen by the user (network time) and the user think time available for the server. Further, the system and method of the present invention may employ a resource manager to monitor server us age and off-load the caching process to another dedicated system that may be currently under utilized.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1-5, embodiments of a method and system for look ahead caching of personalized web content for portals are shown. In an advantageous aspect of the present invention, personalized web content may be delivered to a cache before web pages are accessed by a user by optimally using the application system CPU cycles or optionally off-loading the caching to an external system. This may provide an enhanced user experience by reducing latency and improving performance for resources accessed for the first time.

Figure 1:
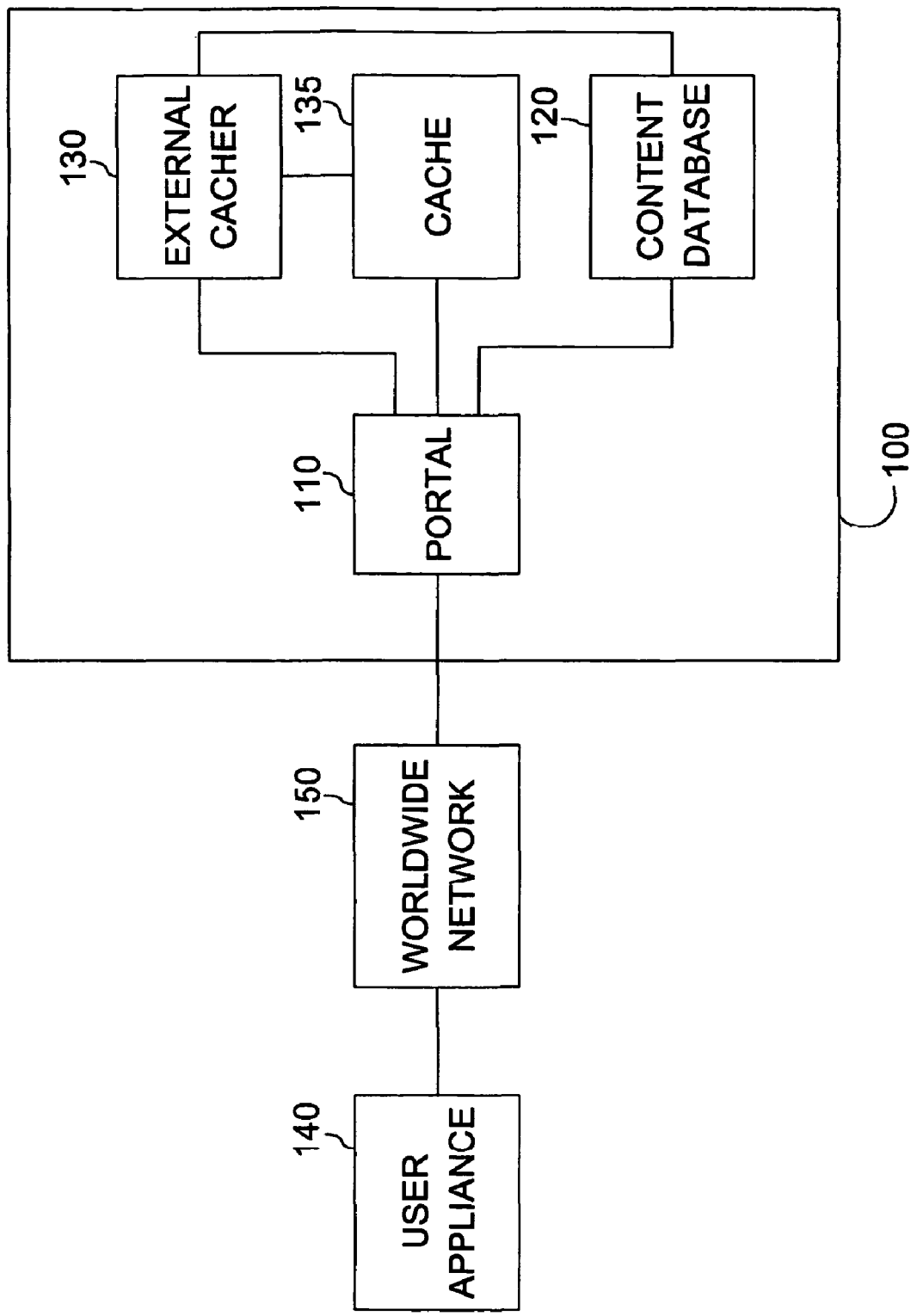
FIG. 1 depicts a system of the present invention for providing personalized content to a user.

Referring to FIG. 1, a system 100 of the present invention for providing personalized content to a user is shown. System 100 includes a portal 110, a content database 120, an external cacher 130 and a cache 135. System 100 may be accessed by a user via a user appliance 140 by accessing the portal 110 through a worldwide network 150. In an embodiment of the invention, worldwide network 150 may be the Internet where portal 110 refers to a web site of the World Wide Web of the Internet. For example, portal 110 may refer to a web site or service, providing a broad array of services, including electronic mail, forums, search engines and on-line shopping.

System 100 may provide personalized content in conformity with a user's profile, retrieved when a user logs in to portal 110. In an advantageous aspect of the present invention, portal 110 may execute look ahead caching of content in conformity with a particular user. Portal 110 may retrieve content from content database 120 and place the content suitable for a particular user in cache 135. Content database 120 may refer to a server or collection of servers where content is maintained. Cache 135 may refer to a memory, or alternatively a memory subsystem, mass storage device or database tables where by content is duplicated for fast access.

Portal 110 may be capable of analyzing its resource capability. If the portal's resource capability is exhausted or nearly exhausted, retrieval of content in conformity with a particular user may be handled by an external cacher 130. For example external cacher 130 that may perform the look ahead caching when the system resources of portal 110 are exhausted. External cacher 130 may refer to another dedicated system or system in the application pool or a separate process that may be off-loaded to a different processor (external queue processor) on the same system or an external process on a dedicated system external to portal 110, but connected to portal 110 via a high speed network. An application pool or resource pool may be a collection of under-utilized or idle servers. Once a peak is detected in the portal 110, the portal's load may be off-loaded to a server, or servers in the resource pool.

Figure 2:
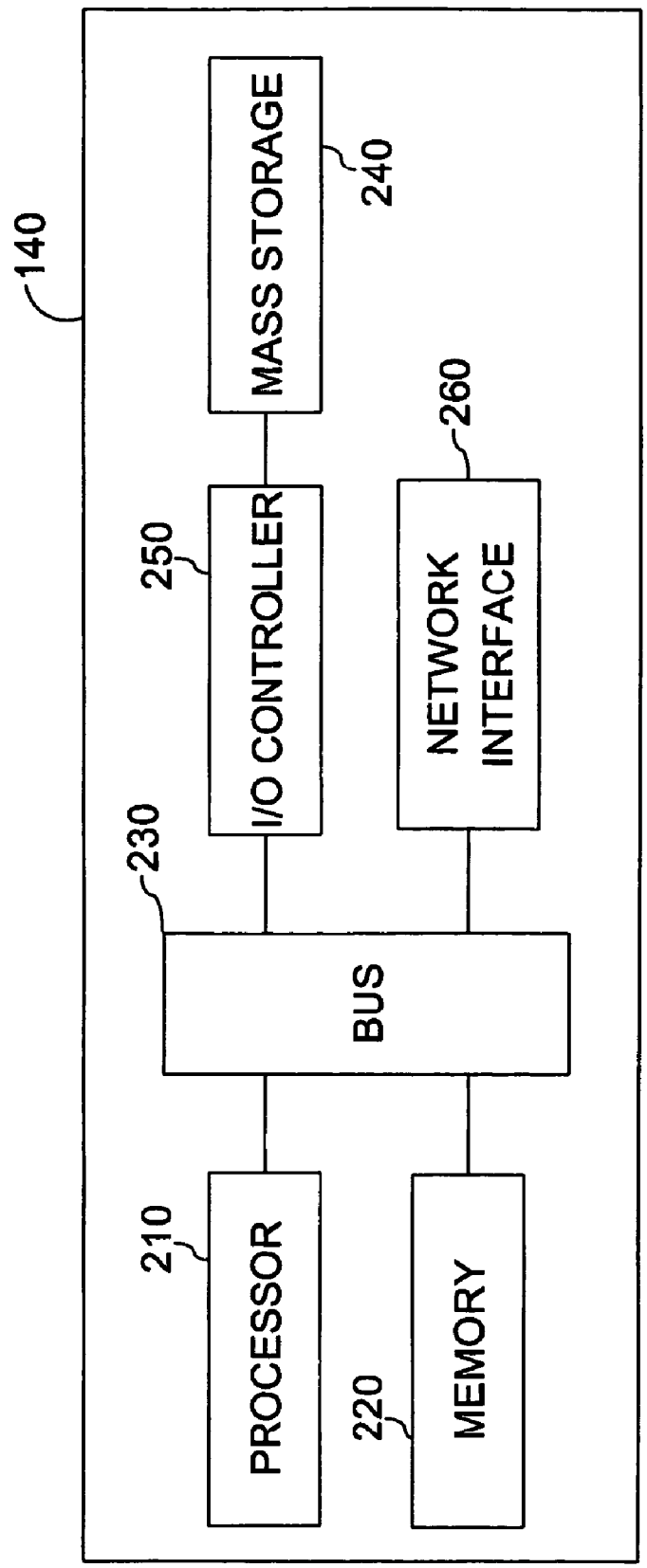
FIG. 2 depicts a block diagram of a user appliance for accessing a portal in accordance with the present invention.

Referring to FIG. 2, a block diagram of a user appliance 140 in accordance with the present invention is shown. User appliance 140 may refer to the digital appliance suitable for accessing the portal 110 of the present invention through a worldwide network 150 of FIG. 1. Examples of a user appliance may include, but is not limited to, a personal computer, personal digital assistant, cellular telephone, web browser appliance and the like.

User appliance 140 and may include conventional components such as a processor 210, memory 220 (e.g. RAM), a bus 230 which couples the processor 210 and memory 220, a mass storage device 240 (e.g. a magnetic or optical disk) coupled to the processor 210 and memory 220 through an input output (I/O) controller 250 and a network interface 270, such as a modem. It is contemplated that a user may access portal 110 of FIG. 1 through worldwide network 150 via a network interface 260, whereby a program of instructions including instructions for accessing a worldwide network may be stored in memory 220 or mass storage device 260 and executed by processor 210.

Figure 3:
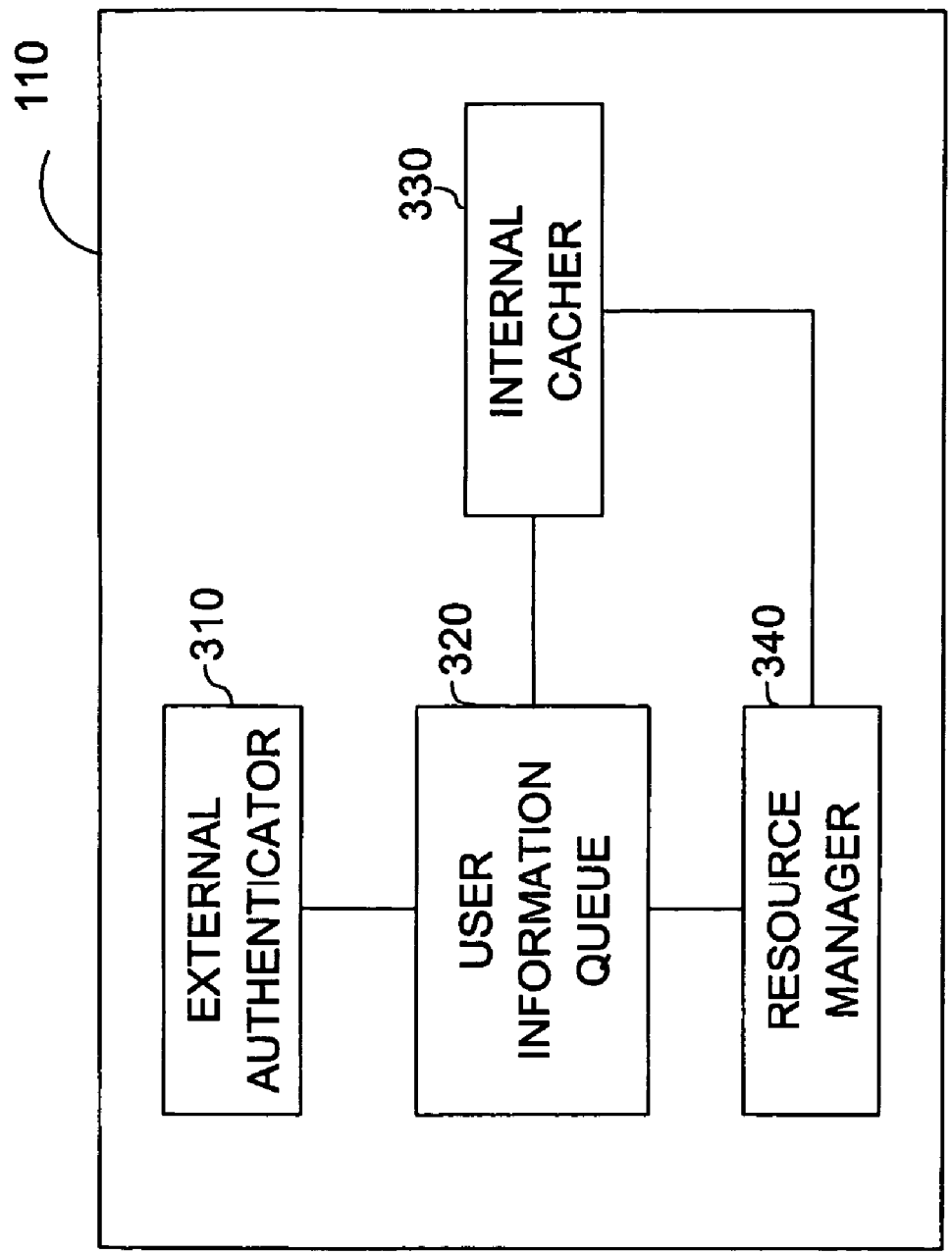
FIG. 3 is a block diagram of a portal in accordance with the present invention.

Referring now to FIG. 3, a block diagram of a portal 110 in accordance with the present invention is shown. Portal 110 may be implemented in a server system, including a single server or plurality of servers for executing the method for look ahead caching in accordance with the present invention. It is contemplated that portal 110, as shown in FIG. 3, may not refer to specific devices and components, rather functionalities performed by portal 110. Similar to user appliance 140 as described in FIG. 2, portal 110 may include a processor 210, memory 220 (e.g. RAM), a bus 230 which couples the processor and memory, a mass storage device 240 (e.g. a magnetic or optical disk) coupled to the processor 210 and memory 220 through an input output (I/O) controller 250 and a network interface 260, such as a modem. Through execution of executable instructions stored in memory 220 or mass storage device 240, the portal 110 may provide personalized content to a user.

In an embodiment of the invention, portal 10 may include an external authenticator 310, a user information queue 320, internal cacher 330 and resource manager 340. External authenticator 310 may refer to the authentication of a particular user. Each user that desires access to portal 110 may have a user login name and password. Upon entry to the portal 10, a user is queried regarding the user login name and password. Upon successful authentication of the login name and password, a user is granted access to the portal 110. In alternative embodiments of the invention, external authenticator 310 may be IR (IBM registration) or WIM (Web Identity Manager). A user information manager 320 may refer to a database or the like, whereby each registered user's profile is maintained. Upon authentication of a user by the external authenticator 310, a user's profile may be retrieved from the user information manager 320.

The user's profile may include information that pertains to a user. This information may include personal information about the user, including sex, age, income, marital status and the like. Additionally, this information may include desired content types, including those relating to news, entertainment, sports, games, education and the like. Further, information associated with a user may include frequently accessed pages, preferred language, preferred geographic location and the like. Information may also include preferred industry interest areas, including promotions, sales and quotes.

Internal cacher 330 may execute a look ahead caching process which may provide personalized content to a user. A user's profile may be retrieved from the user information manager 320 in order to retrieve content in conformity with the user's profile. Internal cacher 330 may include the cache memory including processing resources for executing the look ahead caching process in accordance with the present invention.

Resource manager 340 may refer to circuitry and software for monitoring processing resources of the portal 110. In an embodiment of the invention, resource manager 340 may monitor resources of the portal 110 including thread counts, central processing unit usage, memory usage, input/output (IO) usage and the like. Further, resource manager may be capable of determining if the application resources of the internal cacher 330 are exhausted or near exhaustion, and if so, resource manager may delegate retrieval of personalized content for the user to an external cacher 130 as shown in FIG. 1.

Figure 4:
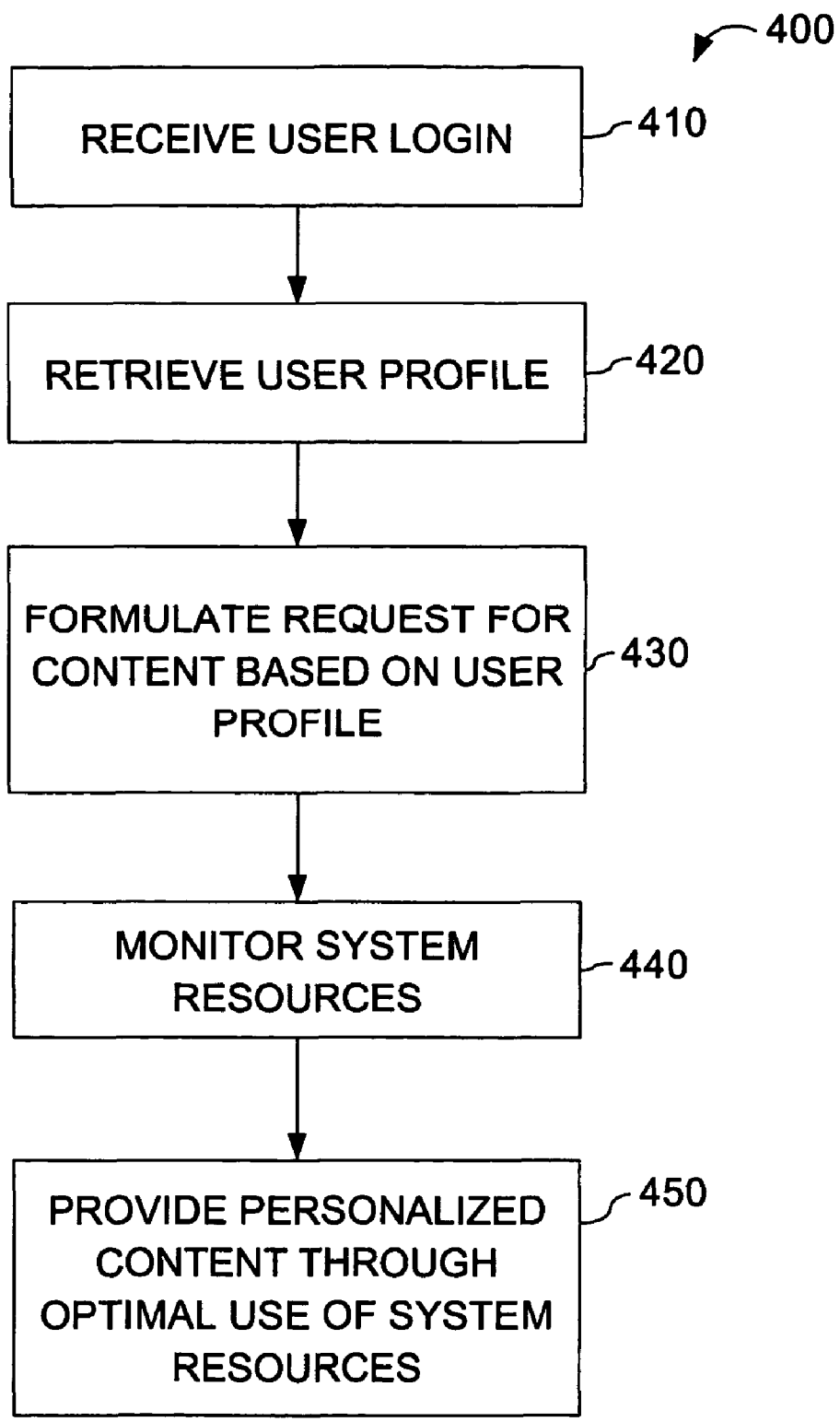
FIG. 4 depicts a method for providing personalized content in conformity with a user's profile in accordance with the present invention.

Referring now to FIG. 4, an embodiment of a method 400 for providing personalized content in conformity with a user's profile in accordance with the present invention is shown. Method 400 may begin upon the receipt of a user login 410. For example, when a user accesses a portal of the present invention, the user may be prompted to provide a user name and password. Upon verification of the user name and password to determine if a user is permitted access to the portal, the user profile associated with the user may be retrieved 420. A request for content based upon the user profile may be formulated 430. In an advantageous aspect of the present invention, this request for content may be formulated prior to a request for content by the user. For example, the method 400 may make use of the time period between server response and the actual time the response is seen by the user (network time) and the user think time available for the server to cache content in conformity with the user's profile.

During the formulation of a request of content and retrieval of the personalized content, system resources of the portal may be monitored 440. For example, system resources such as thread count, central processing unit usage, memory usage, input/output (IO) usage and the like may be monitored to determine if they may effectively process the content query. Through monitoring of system resources, personalized content may be provided to the user through optimal use of system resources 450. For example, if the internal cacher 230 (FIG. 2) has exhausted its resources for providing content, retrieval of content may be completed by a second system, such as an external cacher 130 (FIG. 1).

Figure 5:
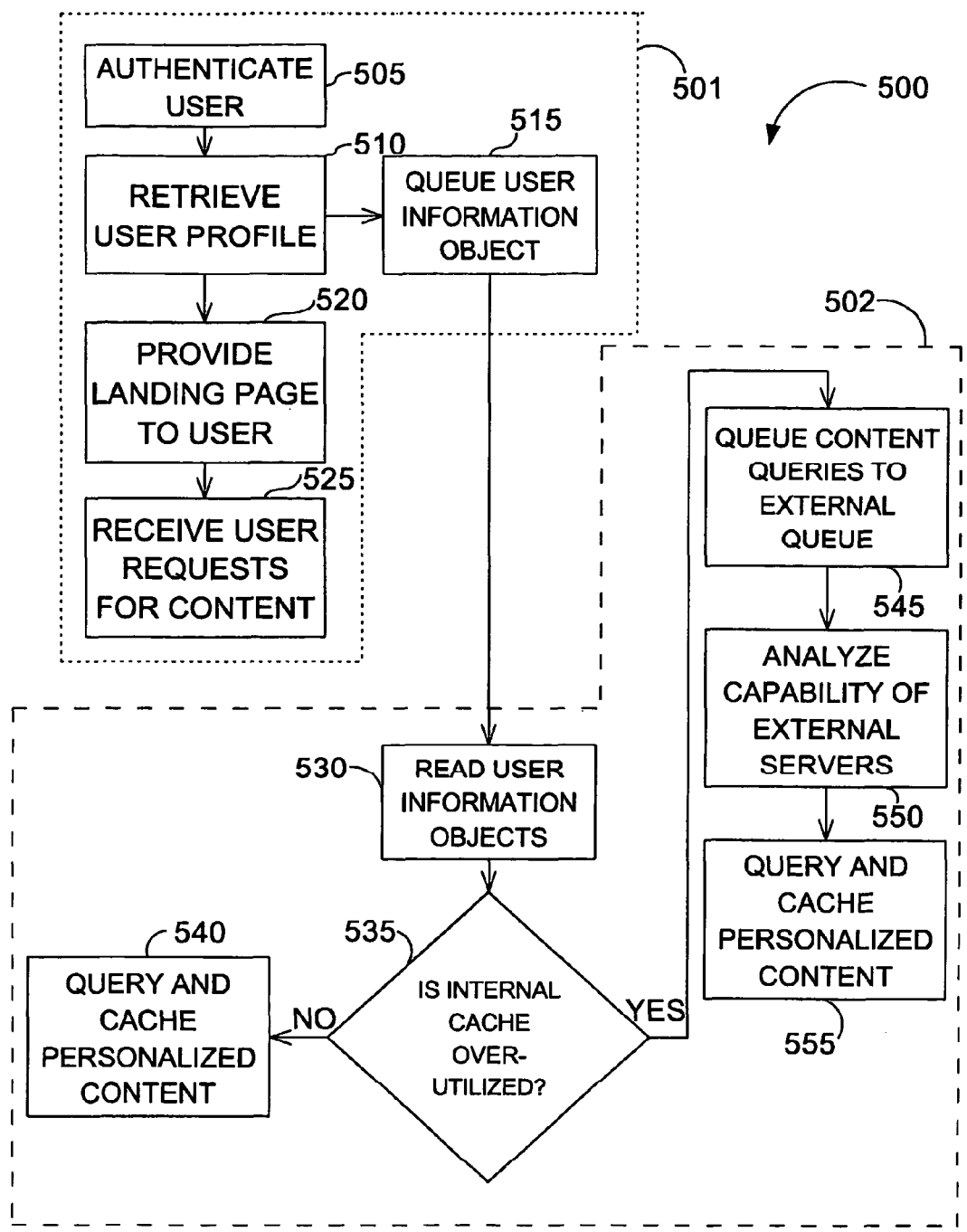
FIG. 5 depicts a detailed method for providing personalized content in conformity with a user's profile in accordance with the present invention.

Referring now to FIG. 5, an embodiment of a detailed method 500 for providing personalized content in conformity with a user's profile in accordance with the present invention is shown. In an embodiment of the invention, two threads (a main application workflow thread 501 and look ahead caching thread 502) may be performed simultaneously and cooperatively in order to provide personalized content in conformity with a user's profile in a rapid fashion. A main application workflow thread 501 may begin authentication of a user 505. Authentication of the user may include verification of a user name and password received from a user. Further authentication of the user may be in compliance with IR (IBM registration) or WIM (Web Identity Manager). When a user has been authenticated, a user's profile may be retrieved 510. The user profile may include information pertaining to a user with regards to content selections, frequently accessed pages, preferred language, preferred geographic location and the like. This information relating to the user profile may be placed in a user information object, these objects may be queued to a user information queue 515.

When the user information object is in the user info queue, the user may be provided with the requested page or landing page 520. At this time, the portal may receiver user requests for content 525. At this point, a time period consisting of system time to complete the current request for content, network time to provide content to the user's client application, and the user's time spent on selecting content to initiate the next request has passed. Advantageously, during this time period, all required content queries may be cached as according to the look ahead caching thread 502 of the present invention. It is contemplated that method 400 and 500 of the present invention may be especially advantageous for users with lower bandwidth connections, as network time may be greater than for users with high-speed Internet connections.

The look ahead caching thread 502 of the present invention provides personalized content for the user while monitoring system resources available to provide personalized content. Look ahead caching in accordance with the present invention may provide content suitable to a particular user, even if the content has not been accessed by the user on a prior occasion. For instance, if the user has an affinity for current sports news, then web pages relating to sports news may be cached for the user. These web pages may not have been accessed by the user on a prior occasion; rather the web pages are in compliance with a user's personalization choices. The look ahead caching thread 502 may continuously monitor the user information queue, and may read each user information object from the queue 530, (i.e. de-queue the user information queue). A check is performed to determine if the application over-utilized, this check may determine if system resources are within pre-defined limits, also known as thresholds.

When the application is not over-utilized, the internal cacher, part of the portal 110 of FIG. 3, executes content data queries to pre-fill a cache 540, depending on user personalization choices read from the user information queue 515. Caching may be performed simultaneous with the main workflow thread and when the user is able to interact with the portal, the content may be in the cache, reducing latency for the user.

When the application is over-utilized, the necessary content queries (the caching request) may be queued to a second system, such as an external queue 545. Ira an embodiment of the invention, the queue may be implemented through a Websphere®message queue (MO) product from International Business Machines Corporation. An analysis of the available external cachers for handling the content query may be performed 550. For example, external cachers may refer to individual servers, a list of possible servers available in a resource pool being available to an external queue processor. The external queue processor may determine which of the available external cachers in the application pool are currently under-utilized and may off-load the content query caching to the under-utilized external cacher. The under-utilized cacher may execute content data queries to pre-fill a cache depending on user personalization choices read from the user information queue 555.

It is contemplated that the external queue may monitor itself for requests for content. The queue may be a message queue (MO) application or similar middleware. In a preferred embodiment, content queries performed external to the portal 110 of FIG. 1 may be executed asynchronously to pre-fill the cache depending upon user personalization choices similar to the process implemented by the internal cacher. Advantageously, pre-fliling of content may provide further reduced latency for subsequent requests for content that has been cached.

It is contemplated that those with ordinary skill in the art that various mechanisms exist for measuring system resource capacity, as implemented in step 535 and step 550 of the process 500 for providing personalized content in accordance with the present invention. For example, mechanisms exist for measuring processing availability, CPU cycles, memory availability, input/output availability, bandwidth availability and the like. In accordance with the present invention, off-loading of caching to the external cacher may be initiated when one of the thresholds is exceeded. For example, if the processing availability exceeds a threshold, then caching may be off-loaded to the external cacher.

In an alternative embodiment of the invention, if multiple thresholds are exceeded, off-loading may commence. For instance, if processing availability exceeds a threshold, memory availability exceeds a threshold, and input/output availability exceeds a threshold, then caching may be off-loaded to the external cacher. In yet another embodiment of the invention, off-loading to an external cacher may be executed when thresholds of all measured system resources have been exceeded.

It is contemplated that a threshold may refer to a percentage of full operating capacity, and the like. For example, a threshold may be 75% of full operating capacity. If the processing capability should exceed 75% operating capacity, the processing capability threshold may be exceeded. It is contemplated that other types of thresholds may be implemented in accordance with the present invention by those with ordinary skill in the art without departing from the scope and intent of the present invention.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing content to a user, the method including instructions stored in memory and executable by a processing unit, the instructions comprising:
    authenticating a user;
    retrieving a user profile associated with said user, said user profile including age information, sex information and information describing content preferences of said user, said content preferences including content types, frequently accessed pages, preferred language and preferred geographic location;
    formulating a query for content based on said user profile and content preferences, said query being formulated prior to a request for content by said user;
    determining if a first system has available resources for querying and retrieving content in conformity with said content preferences within a desired threshold based upon processing unit cycles;
    delivering content queries to a second system when said first system has unavailable resources within said desired threshold for querying and retrieving content in conformity with said content preferences; and receiving and storing content from said query for content in conformity with said user profile and content preferences, said content being cached for said user.

2. The method as claimed in claim 1, wherein authenticating said user includes:
receiving a name and password of said user; and
verifying said user is permitted access to receive content.

3. The method as claimed in claim 1, wherein said first system queries and retrieves content when said first system has available resources within said desired threshold.

4. The method as claimed in claim 1, wherein said second system queries and retrieves content when said first system has unavailable resources within said desired threshold.

5. The method as claimed in claim 1, further comprising selecting said second system for querying and retrieving content in conformity with said content preferences, said second system being selected when said second system is being under-utilized in comparison to a plurality of systems.

6. The method as claimed in claim 1, wherein said desired threshold includes a memory capacity and an input or output capacity.

7. A system for providing content to a user, said system including a processing unit and memory for storage of instructions, comprising:
means for authenticating a user;
means for retrieving a user profile associated with said user, said user profile including age information, sex information and information describing content preferences of said user, said content preferences including content types, frequently accessed pages, preferred language and preferred geographic location;
means for formulating a query for content based on said user profile and content preferences, said query being formulated prior to a request for content by said user;
means for determining if a first system has available resources for querying and retrieving content in conformity with said user profile and content preferences within a desired threshold based upon processing unit cycles;
means for delivering content queries to a second system when said first system has unavailable resources within said desired threshold for querying and retrieving content in conformity with said content preferences; and
means for receiving and storing content from said query for content in conformity with said content preferences, said content being cached for said user.

8. The system as claimed in claim 7, wherein means for authenticating said user includes:
means for receiving a name and password of said user; and
means for verifying said user is permitted access to receive content.

9. The system as claimed in claim 7, wherein said first system queries and retrieves content when said first system has available resources within said desired threshold.

10. The system as claimed in claim 7, wherein said second system queries and retrieves content when said first system has unavailable resources within said desired threshold.

11. The system as claimed in claim 7, further comprising means for selecting said second system for querying and retrieving content in conformity with said content preferences, said second system being selected when said second system is being under-utilized in comparison to a plurality of systems.

12. The system as claimed in claim 7, wherein said desired threshold includes a memory capacity and an input or output capacity.

13. A method for providing content to a user, the method including instructions stored in memory and executable by a processing unit, the instructions comprising:
authenticating a user, wherein authenticating the user includes receiving a name and password of the user;
retrieving a user profile associated with said user when said user is authenticated, said user profile including age information, sex information and information describing content preferences of said user, said content preferences including content types relating to news, sports, games and education, frequently accessed pages, preferred language and preferred geographic location;
providing a welcome page to said user, said welcome page configured for receipt of a user request for content;
formulating a query for content based on said user profile and content preferences, said query being formulated prior to said user request for content;
determining if a first system has available resources for querying and retrieving content in conformity with said user profile and content preferences within a desired threshold based upon processing unit cycles, said first system querying and retrieving content when said first system has available resources within said desired threshold;
delivering content queries to a second system when said first system has unavailable resources within said desired threshold for querying and retrieving content in conformity with said content preferences, said second system querying and retrieving content when said first system has unavailable resources within said desired threshold; and
receiving and storing content from said query for content in conformity with said content preferences, said content being cached for said user.

14. The method as claimed in claim 13, wherein authenticating said user includes:
verifying said user is permitted access to receive content.

15. The method as claimed in claim 13, further comprising selecting said second system for querying and retrieving content in conformity with said user profile and content preferences, said second system being selected when said second system is being under-utilized in comparison to a plurality of systems.

16. The method as claimed in claim 13, wherein said desired threshold includes a memory capacity and an input or output capacity.

* * * * *